United States Patent
Chevillard et al.

(10) Patent No.: US 6,972,311 B2
(45) Date of Patent: Dec. 6, 2005

(54) OPTIMIZING POLYSTYRENE IN THE PRESENCE OF ADDITIVES

(75) Inventors: Cyril Chevillard, Dickinson, TX (US); Jose M. Sosa, Deer Park, TX (US); Aron Griffith, Humble, TX (US); Jay Reimers, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 269 days.

(21) Appl. No.: 10/445,760

(22) Filed: May 27, 2003

(65) Prior Publication Data

US 2004/0242827 A1 Dec. 2, 2004

(51) Int. Cl.[7] .............................. C08F 12/02; C08F 2/38; C08F 279/02
(52) U.S. Cl. .................... 526/346; 526/224; 526/230.5; 526/232.3; 526/347; 525/261; 525/264; 525/273; 525/316; 521/146; 521/148
(58) Field of Search ................................ 526/346, 204, 526/230.5, 224, 232.3, 336, 347; 525/261, 264, 316, 273

(56) References Cited

U.S. PATENT DOCUMENTS

| | | | |
|---|---|---|---|
| 3,357,964 A | * 12/1967 | Gulpin et al. | ............ 526/232.3 |
| 4,918,159 A | 4/1990 | Nakamura et al. | |
| 5,059,667 A | * 10/1991 | Nakamura | .................. 526/324 |
| 5,191,040 A | 3/1993 | Okumura et al. | |
| 5,540,813 A | 7/1996 | Sosa et al. | |
| 6,353,066 B1 | 3/2002 | Sosa | |
| 6,476,149 B1 | 11/2002 | Krupinski | |

OTHER PUBLICATIONS

Atofina Chemicals, Inc., "Organic Peroxides Technical Bulletin: LUPEROX® JWEB50," Apr. 26, 2001, Philadelphia, PA.

* cited by examiner

*Primary Examiner*—Fred Teskin
(74) *Attorney, Agent, or Firm*—Madan, Mossman & Sriram (57) ABSTRACT

It has been discovered that improved polystyrene products may be obtained by polymerizing styrene in the presence of at least one multifunctional initiator, at least one chain transfer agent, and at least one cross-linking agent. The presence of the multifunctional initiator tends to cause more branched structures in the polystyrene. A mathematical model that helps optimize the levels of these additives for given molecular weights, melt flow indices (MFIs) and zero shear viscosities ($\eta_0$) has also been discovered.

39 Claims, 10 Drawing Sheets

OPTIMIZING POLYSTYRENE IN THE PRESENCE OF ADDITIVES

FIELD OF THE INVENTION

The present invention is related to methods and compositions useful to improve the manufacture of polystyrene and copolymers of styrene. It relates more particularly to methods of polymerizing and copolymerizing styrene monomer with multifunctional initiators in the presence of crosslinking agents and chain transfer agents that yield highly branched polystyrene.

BACKGROUND OF THE INVENTION

The polymerization of styrene is a very important industrial process that supplies materials used to create a wide variety of polystyrene-containing articles. This expansive use of polystyrene results from the ability to control the polymerization process. Thus, variations in the polymerization process conditions are of utmost importance since they in turn allow control over the physical properties of the resulting polymer. The resulting physical properties determine the suitability of polystyrene for a particular use. For a given product, several physical characteristics must be balanced to achieve a suitable polystyrene material. Among the properties that must be controlled and balanced are averaged molecular weight (Mw) of the polymer, molecular weight distribution (MWD), melt flow index (MFI), and the storage modulus (G').

U.S. Pat. No. 5,540,813 by Sosa, et. al., which is incorporated herein by reference, discloses a process for preparing monovinyl aromatic polymers, such as polystyrene, which utilizes a combination of sequentially ordered multiple reactors, heat exchangers and devolatilizers to strictly control polymer properties such as the molecular weight distribution and melt flow index.

The relationship between the molecular weight and the storage modulus is of particular importance in polymer foam applications. Such foam applications require high molecular weight polymers having a high storage modulus. It is thought that the storage modulus is related to the degree of branching along the polymer chain. As the degree of branching increases, the likelihood that a branch entangles with other polymer chains increases. A polymer product having a higher degree of branching or cross-linking tends to have a higher storage modulus and, therefore, better foam stability characteristics.

Methods for preparing branched polymers are well-known in the art. For example, the preparation of branched polystyrene by free radical polymerization has been reported. Both methods increase the branching in the devolatilization step and produce a polymer with an undesirably low molecular weight.

Rather than employing free radical polymerization, some have used multi-functional mercaptans to form branched polymers. While materials having an acceptable molecular weight can be prepared by this method, these products are unacceptable for foam applications due to their undesirable flow properties.

The properties of randomly branched polystyrene prepared in the presence of divinylbenzene have been reported by Rubens (L. C. Rubens, Journal of Cellular Physics, pp 311–320, 1965). However, polymers having a useful combination of molecular weight and cross-linking are not attainable. At low concentrations of divinylbenzene, low molecular weight polymers having little branching result. However, higher concentrations of the cross-linking agent result in excessive cross-linking and concomitant gel formation that is highly undesirable in industrial polystyrene processes. Similar results and problems were reported by Ferri and Lomellini (J. Rheol. 43(6), 1999).

A wide variety of peroxy compounds is known from the literature as initiators for the production of styrenic polymers. Commercially available initiators for polymer production may be classified in different chemical groups, which include diacylperoxides, peroxydicarbonates, dialkylperoxides, peroxyesters, peroxyketals, and hydroperoxides. Peroxides and hydroperoxides undergo at least four reactions in the presence of monomers or hydrocarbons with double bonds. These reactions are: 1) chain transfer, 2) addition to monomer, 3) hydrogen abstraction, and 4) re-combination, often called a cage effect.

Hydroperoxides have been shown to undergo induced decomposition reactions, in which a polymer radical (~~P*) will react with the initiator as shown below. This reaction is basically a chain transfer reaction and the reaction should be amenable to the well-known chain transfer equations. Radicals obtained from peroxide initiators (RCOO*) can also abstract a hydrogen from the hydroperoxide.

$RCOO^*$ or $\sim\sim P^* + RCOOH \rightarrow \sim\sim PH + ROO^*$

Baysal and Tobolsky (Journal of Polymer Science, Vol. 8, p. 529 et seq., (1952), incorporated by reference herein) investigated the chain transfer of polystyryl radicals to t-butyl hydroperoxide (t-BHP), cumyl hydroperoxide (CHP), benzoyl peroxide ($Bz_2O_2$), and azobisisobutyronitrile (AIBN). AIBN and benzoyl peroxide give the classical linear correlations between rate and 1/DP (Degree of Polymerization) indicating no chain transfer to initiators. The hydroperoxides, however, show significant levels of chain transfer.

A. I. Lowell and J. R. Price (Journal of Polymer Science, Vol. 43, p. 1, et seq. (1960), incorporated by reference herein) also showed that polystyryl radicals undergo considerable chain transfer with bis(2,4-dichloro) benzoyl peroxide as compared to dilauroyl peroxide.

Commercial polystyrene made by the conventional free-radical process yields linear structures. As noted, methods to prepare branched polystyrenes, however, are not easily optimized and few commercial non-linear polystyrenes are known. Studies of branched polymers show that these polymers possess unique molecular weight-viscosity relationships due to the potential for increased molecular entanglements. Depending upon the number and length of the branches, non-linear structures can give melt strengths equivalent to that of linear polymers at slightly higher melt flows.

U.S. Pat. No. 6,353,066 to Sosa describes a method of producing a copolymer by placing a vinylbenzene (e.g. styrene) in a reactor, placing a cross-linking agent (e.g. divinylbenzene) in the reactor, and placing a chain transfer agent (e.g. mercaptan) in the reactor and forming a polyvinylbenzene in the presence of the cross-linking agent and chain transfer agent. It would be desirable if methods could be devised or discovered to provide vinylaromatic polymers with increased branching, such as branched polystyrene with improved properties. It would also be helpful if a method could be devised that would help optimize the physical properties of vinylaromatic polymers having increased branching. Such polymers may have a higher melt strength than linear chains, and may improve processability and mechanical properties of the final product (e.g. increase density in foam application).

SUMMARY OF THE INVENTION

There is provided, in one form, a method for producing an improved polymerized product that involves polymerizing at least one vinylaromatic monomer in the presence of at least one multifunctional initiator that is selected from the group consisting of trifunctional and tetrafunctional peroxides. The polymerization is also conducted in the presence of at least one chain transfer agent and at least one cross-linking agent. A polymerized product is recovered.

In another embodiment of the invention, there is provided a vinylaromatic monomer resin that includes at least one vinylaromatic monomer, at least one multifunctional initiator selected from the group consisting of trifunctional and tetrafunctional peroxides, at least one chain transfer agent, and at least one cross-linking agent.

In another embodiment of the invention, there is provided a vinylaromatic/diene graft copolymer made by polymerizing at least one vinylaromatic monomer with at least one polydiene in the presence of at least one multifunctional initiator, at least one chain transfer agent, and at least one cross-linking agent. A copolymerized product is recovered.

In still another embodiment of the invention, a mathematical method and model was discovered to optimize the physical properties of polystyrene in the presence of the additives of this invention.

DETAILED DESCRIPTION OF THE INVENTION

The inventors have explored the potential for providing branched polystyrene having at least some increased branching by using tetrafunctional initiators or trifunctional initiators, chain transfer agents, and cross-linking agents. The invention concerns initiating a vinyl aromatic monomer such as styrene in various solvents and in the optional presence of a polydiene, such as polybutadiene, with a multifunctional initiator (e.g. tri- or tetrafunctional) and to use the multifunctional initiator to obtain branched structures. A mathematical model has also been discovered that helps define the proportions of chain transfer agent and cross-linking agent for a given melt flow index, molecular weight and zero shear viscosity.

In theory, tetrafunctional materials can be schematically represented by the shape of a cross. If at the end of each arm of the cross, the potential for initiation or chain transfer exists, it is possible to envision polystyrene molecules that will have higher molecular weight than by using bifunctional initiators only. Similarly to tetrafunctional initiators, trifunctional initiators simply have three "arms" or starting points instead of the four found in tetrafunctional initiators.

In polymerizations by the step mechanisms as here, equations may be used to predict the point at which crosslinking or gelation occurs. In the present case, relatively small levels of the tetrafunctional initiators are used to optimize the melt properties resulting from the formation of branched structures. With the tetrafunctional initiator, four linear chains for one branched molecules are formed. At high levels of initiators the amount of linear chains, initiated by the alkyl radicals, will lower the effect brought by the branched chains, initiated by the tetra-functional radicals.

The composition of the invention can comprise a polydiene-modified monovinyl aromatic polymer, and can comprise a rubber (polybutadiene)-modified polystyrene. Non-modified vinylaromatic homopolymers are also within the scope of the invention. Styrene monomer can be polymerized in the presence of from about 2 to about 15 weight percent rubber to produce a polymer having impact resistance superior to that of polystyrene homopolymer. A rubber that can be used in making the subject compositions is polybutadiene. The resultant thermoplastic composition, which can be made with these materials, is high impact polystyrene, or HIPS. The predominant morphology of the polymer made from embodiments of the invention is cell or "salami" with some core-shell structure, meaning that the continuous phase of polystyrene comprises a plurality of dispersed structures in which polystyrene is trapped within rubber particles having a distinct membrane and small quantities of polystyrene are occluded inside single cell polybutadiene shells grafted to the aromatic polymer.

Styrene polymerization processes are well known. The compositions of the invention can be made by batch polymerization in the presence of from about 2 to 15, and in some embodiments can be from about 4 to about 12, weight percent polybutadiene using multifunctional initiators at concentrations of from about 100 to about 1200 ppm and using a solvent. In another non-limiting embodiment of the invention the concentration of multifunctional initiator may range from about 100 to about 600 ppm.

In one non-limiting embodiment of the invention, the multifunctional initiator is a trifunctional or tetrafunctional peroxide and is selected from the group consisting of tri- or tetrakis t-alkylperoxycarbonates, tri- or tetrakis-(t-butylperoxycarbonyloxy) methane, tri- or tetrakis-(t-butylperoxycarbonyloxy) butane, tri- or tetrakis (t-amylperoxycarbonyloxy) butane, tri- or tetrakis (t-$C_{4-6}$ alkyl monoperoxycarbonates) and tri or tetrakis (polyether peroxycarbonate), and mixtures thereof. In one non-limiting embodiment of the invention, the tetrafunctional initiator has four t-alkyl terminal groups, where the t-alkyl groups are t-butyl and the initiator has a poly(methyl ethoxy) ether central moiety with 1 to 4 (methyl ethoxy) units. This molecule is designated herein as LUPEROX® JWEB 50 and is available from Atofina Petrochemicals, Inc. Another commercial product suitable as a multifunctional initiator is 2,2 bis(4,4-di-(tert-butyl-peroxy-cyclohexyl)propane) from Akzo Nobel Chemicals Inc., 3000 South Riverside Plaza Chicago, Ill., 60606. Another commercial product is 3,3',4,4' tetra (t-butyl-peroxy-carboxy) benzophenone from NOF Corporation Yebisu Garden Place Tower, 20-3 Ebisu 4-chome, Shibuya-ku, Tokyo 150-6019.

Suitable optional solvents for the polymerization include, but are not necessarily limited to ethylbenzene, xylenes, toluene, hexane and cyclohexane.

In one non-limiting embodiment of the invention, the chain transfer agent is preferably a member of the mercaptan family. Particularly useful mercaptans include, but are not necessarily limited to, n-octyl mercaptan, t-octyl mercaptan, n-decyl mercaptan, n-dodecyl mercaptan, t-dodecyl mercaptan, tridecyl mercaptan, tetradecyl mercaptan, n-hexadecyl mercaptan, t-nonyl mercaptan, ethyl mercaptan, isopropyl mercaptan, t butyl mercaptan, cyclohexyl mercaptan, benzyl mercaptan and mixtures thereof. In advantageous embodiments, the concentration of the chain transfer agent may range from about 0 ppm to about 800 ppm by weight based on the total amount of vinyl aromatic monomers; in one embodiment of the invention, up to about 800 ppm, and in another embodiment of the invention from about 25 to about 800 ppm. In another non-limiting embodiment of the invention, the concentration of the chain transfer agent may range from about 100 ppm to about 400 ppm. Again, if the concentration of chain transfer agent is too low, the storage modulus, G', is not improved and gelation may occurs due to the presence of (divinylbenzene) DVB. However, if the concentration is too high the molecular weight Mw of the resulting polymer is too low to use to manufacture certain products.

In one embodiment the vinylbenzene may be styrene and a preferred cross-linking agent may be a divinylbenzene (DVB). Other suitable cross-linking agents include, but are not necessarily limited to, 1,9-decadiene; 1,7-octadiene; 2,4,6-triallyloxy-1,3,5-triazine; pentaerythritol triacrylate (PETA); ethylene glycol diacrylate; ethylene glycol dimethacrylate; triethylene glycol diacrylate; tetraethylene glycol dimethacrylate; and mixtures thereof. One who is skilled in the art understands that substituted vinylbenzene and substituted divinylbenzene molecules or other tri- or tetrafunctional monomers may also be employed as cross-linking agents. The concentration of the cross-linking agent in the mixture may vary. However, in a preferred embodiment, the cross-linking agent's concentration may range from about 0 ppm to about 400 ppm in one non-limiting embodiment, up to 400 ppm in an alternate embodiment, from about 25 to about 400 ppm in yet another embodiment, and in another non-limiting embodiment may range from about 25 ppm to about 250 ppm. If the concentration of the cross-linking agent is too low the molecular weight, Mw of the resulting polymer may be too low, and if the concentration of the cross-linking agent is too high an undesirable gel may form.

It has been discovered that multifunctional initiators can be used together with chain transfer agents and cross-linking agents to manufacture polystyrene and HIPS that is more highly branched. The chain transfer agent and/or cross-linking agent may be added prior to, during or after the initiator is added to the monomer.

It has also been discovered that the polymerization of a vinyl aromatic monomer such as styrene carried out in the presence of divinylbenzene (DVB) and n-dodecyl mercaptan (NDM) to produced branched structures as disclosed in U.S. Pat. No. 6,353,066 (incorporated by reference herein) can be improved by using a tetrafunctional initiator in combination with DVB and NDM. Extensive studies have been done to determine the conditions suitable for optimizing the melt rheology, however, it has been surprisingly found that an increase in rate can be produced while obtaining the desired molecular parameters.

Grafting is also favored by using polybutadiene having a medium or high-cis isomer content. Polybutadiene useful in making the composition of the invention is produced, for example, by known processes by polymerizing butadiene in either a hexane or cyclohexane solvent to a concentration of about 12 weight percent, and flashing off the solvent at a temperature ranging from about 80° to 100° C. to further concentrate the polybutadiene solution to about 24 to 26 weight percent, the approximate consistency of rubber cement. The crumb polybutadiene is then precipitated from the solution using steam, then dried and baled. Commercially available rubbers suitable for producing HIPS are available from several suppliers such as Bayer 380, 550, and 710 (Bayer Corporation, Orange, Tex.) and Firestone Diene 35, 55 and 70 (Firestone Polymers, Akron, Ohio).

In making the certain compositions of the invention, batch or continuous polymerizations can be conducted in 97:3 to 91:9 styrene to rubber, 85:15 to 80:20 typical styrene solvent mixtures to 60-80% styrene conversion to polystyrene and then flashing off the unreacted monomer and the solvent. In a non-limiting, typical preparation, 3–12% of rubber is dissolved in styrene, then about 10% ethylbenzene is added as 90:10 styrene:ethylbenzene. The ethylbenzene is used as a diluent. Other hydrocarbons can also be used as solvents or diluents. A possible temperature profile to be followed in producing the subject compositions is about 110° C. for about 120 minutes, about 130° C. for about 60 minutes, and about 150° C. for about 60 minutes, in one non-limiting embodiment. The polymer is then dried and devolatilized by conventional means. Although batch polymerizations are used to describe the invention, the reactions described can be carried out in continuous units, as the one described by Sosa and Nichols in U.S. Pat. No. 4,777,210, incorporated by reference herein.

The invention will now be described further with respect to actual Examples that are intended simply to further illustrate the invention and not limit it in any way.

Extensive studies have been done to determine the conditions suitable for optimizing the melt rheology of a branched polystyrene system using multifunctional initiators, chain transfer agents, and cross-linking agents, however it has also been surprisingly discovered that an increase in rate can be obtained while producing the desired molecular parameters. The relationship between molecular weight and melt viscosity is explored. Key parameters to optimize, in the case of foams, include $\eta_0$ (viscosity at zero shear rate) and molecular weight. As noted, novelty arises in that the desired properties can be obtained at higher polymerization rates.

Figure 1:
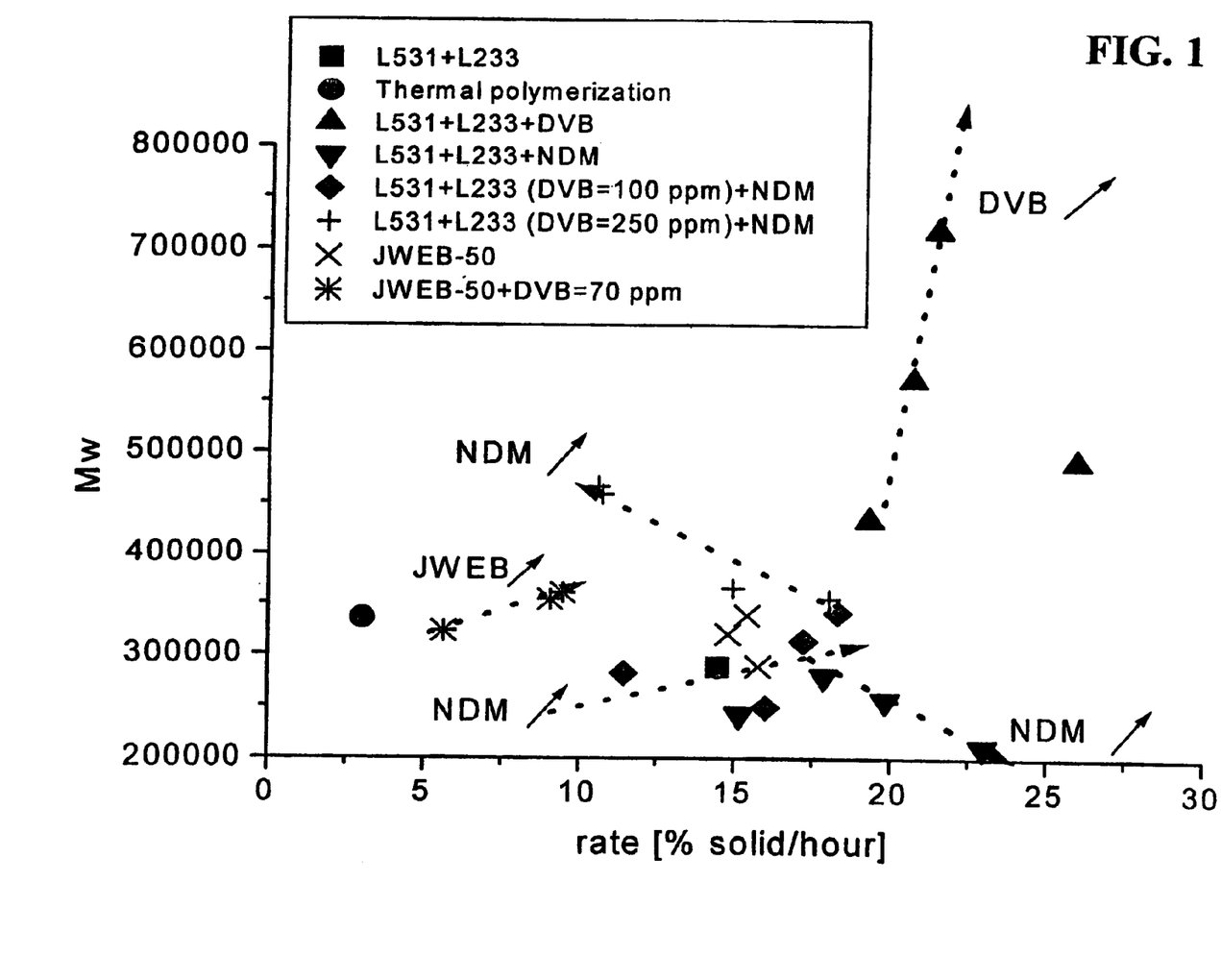
FIG. 1 is a graph of the effects of various additives on the molecular weight (y-axis) and rate (x-axis) for foam grade crystalline polystyrene.

FIG. 1 shows that the various additives (NDM, DVB, initiators) influence the rate and molecular weight of polystyrene in different ways. By using a mixture of the three additives, both rate and molecular weight can be optimized to give the desired melt viscosity.

In one non-limiting embodiment of the invention, under certain conditions, the use of a difunctional initiator (e.g.

LUPERSOL 531 (1,1-di-(t-amylperoxy)cyclohexane) and LUPERSOL 233 (ethyl 3,3 di-tert-butyl-peroxy butyrate) can increase the rate by sevenfold, the addition of DVB increases both rate and Mw, whereas the addition of NDM increases rate and decreases Mw. The use of a multifunctional initiator such as JWEB 50 seems to have a moderate effect on the molecular weight compared to other initiator combinations.

Branched structures have been prepared by using low levels of cross-linking agents such as DVB, tetrafunctional initiators, and chain transfer agents. In this investigation, both DVB and a tetrafunctional initiator (JWEB 50) have been evaluated in terms of the potential to synthesize branched structures. The steps leading to a model to optimize the zero shear viscosity, $\eta_0$, are discussed Batch Experiments with DVB and NDM The first set of experiments concerned the synthesis of polystyrene by using the L531 and L233 initiators in the presence of DVB and NDM at the concentrations shown in Table I. The polymerization is carried out thermally for 2 hours at 110° C., 1 hour at 130° C. and 1 hour at 150° C.

TABLE I

| DVB [ppm] | NDM [ppm] | L531 [ppm] $T_{1/2}$ (1 h) 112° C. | L233 [ppm] $T_{1/2}$ (1 h) 134° C. |
|---|---|---|---|
| 0 | 0 | 350 | 65 |
| 100 | 0 | | |
| 150 | 0 | | |
| 200 | 0 | | |
| 250 | 0 | | |
| 0 | 200 | | |
| 0 | 400 | | |
| 0 | 600 | | |
| 0 | 800 | | |
| 100 | 200 | | |
| 100 | 400 | | |
| 100 | 600 | | |
| 100 | 800 | | |
| 250 | 200 | | |
| 250 | 400 | | |
| 250 | 600 | | |
| 250 | 800 | | |

Batch Experiments with JWEB-50

The second set of experiments concerns the synthesis of polystyrene by using a tetrafunctional initiator (JWEB-50) at the concentration shown in Table II using the same temperature profile described previously.

TABLE II

| JWEB-50 [ppm] $T_{1/2}$ (1 h) 118° C. |
|---|
| 200 |
| 400 |
| 600 |

Analytical Testing

The samples were submitted to gel permeation chromatography (GPC) for molecular weight determination, and to dynamic mechanical analysis (DMA) by using the following protocol:
  Frequency sweep from 500 to 0.1 rad/s at 230° C., 170° C., 140° C.
  Frequency sweep from 500 to 0.01 rad/s at 110° C.

Mz as a Function of Mw: Batch and Plant Samples

Figure 2:
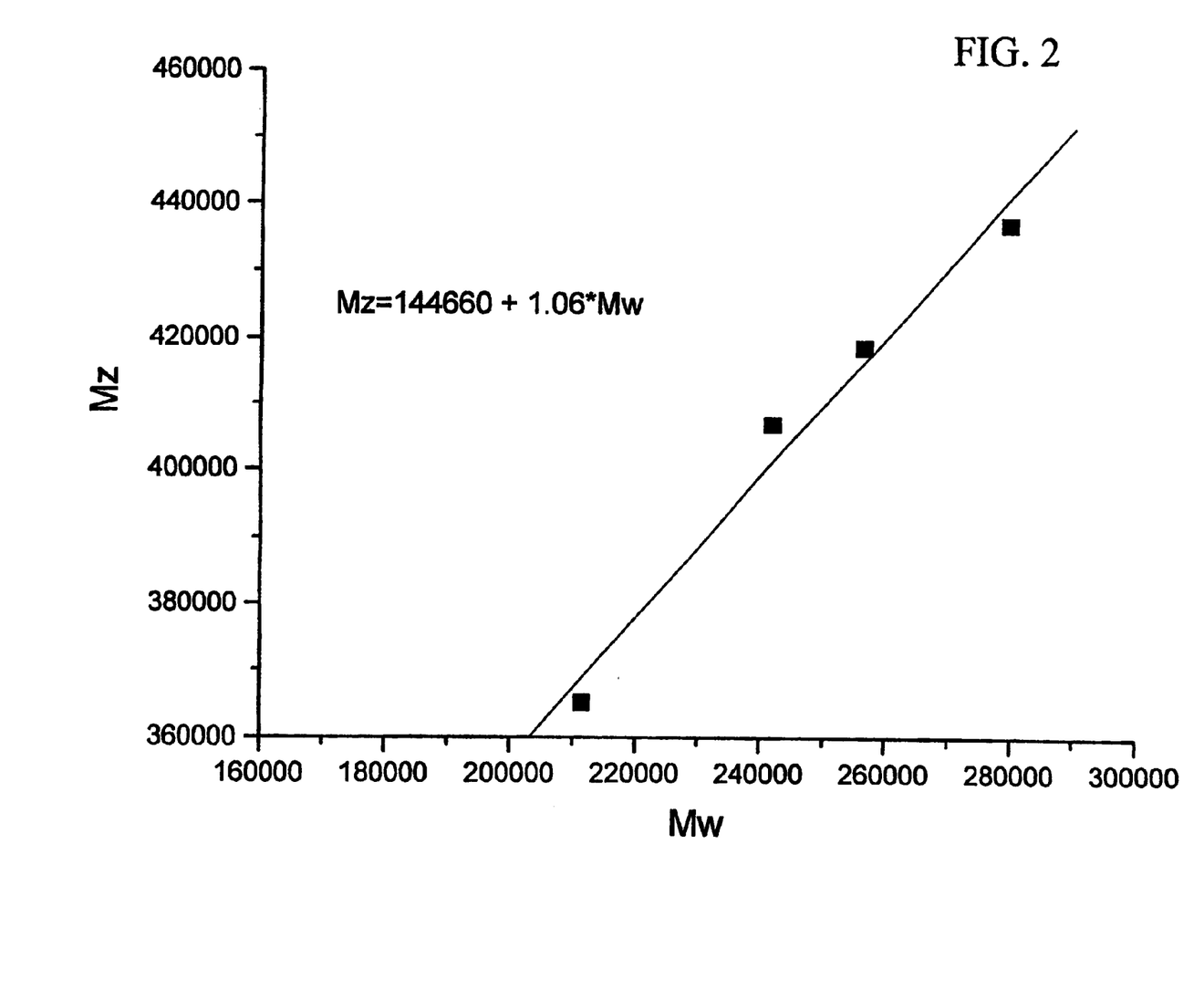
FIG. 2 is a graph of Mz v. Mw for linear polystyrene chains.
Figure 3:
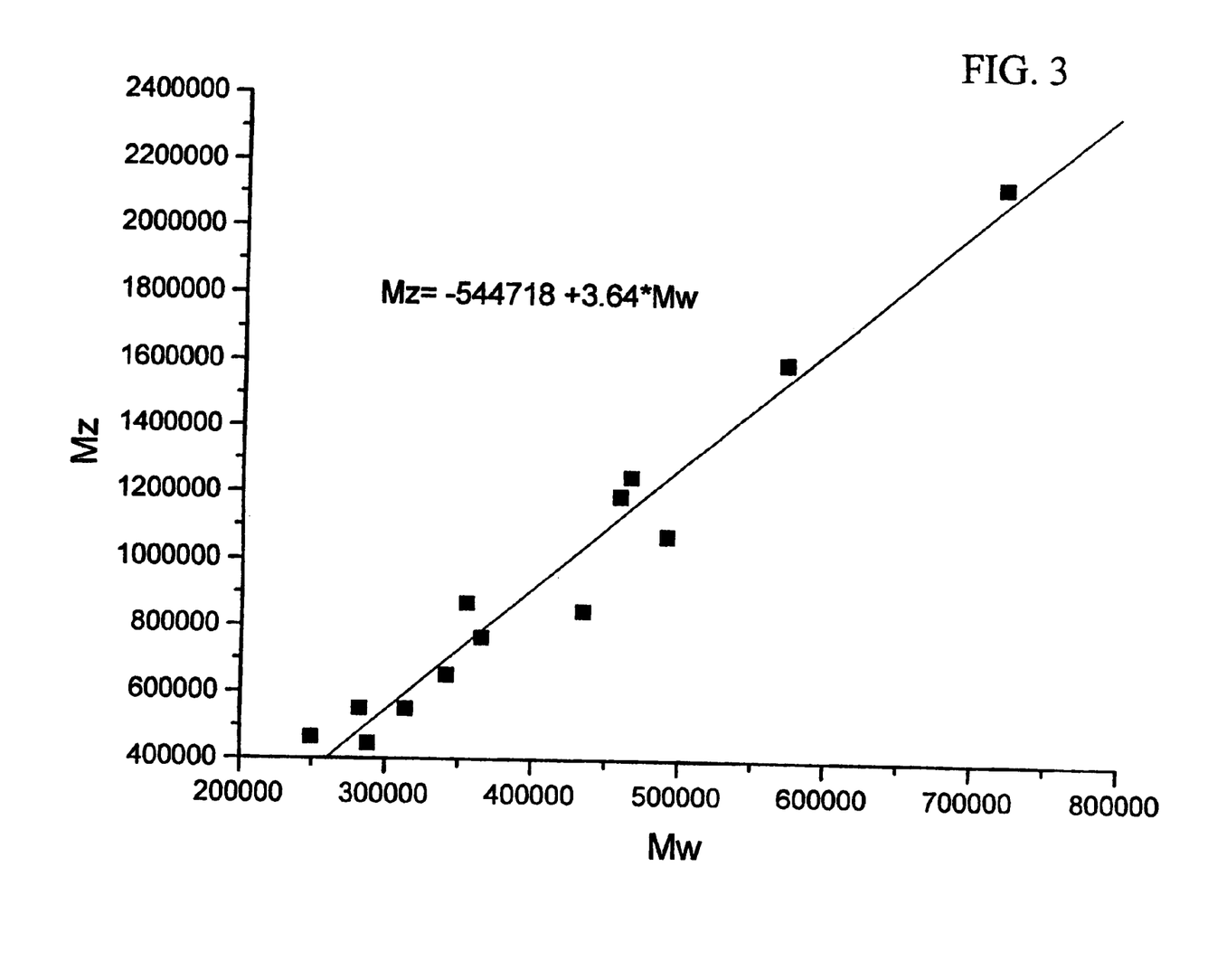
FIG. 3 is a graph of Mz v. Mw for branched polystyrene chains.

FIGS. 2 and 3 display Mz as a function of Mw for linear and branched polystyrene. Note that the slope for linear chain (FIG. 2) is equal to 1.06 and the slope for branched chain (FIG. 3) is equal to 3.64. In other words, Mz for branched polymer is three to four times higher than for linear chains.

Figure 4:
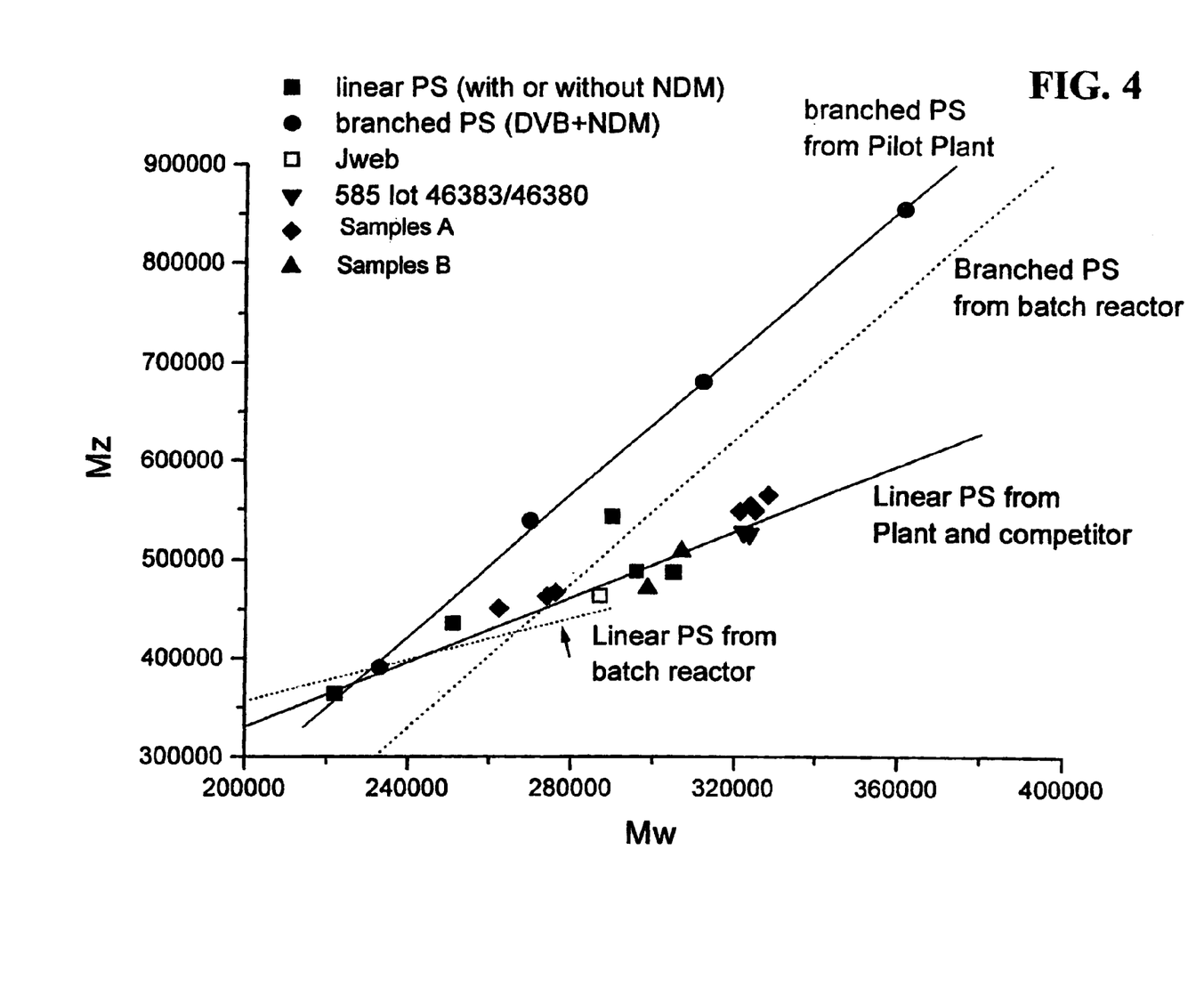
FIG. 4 is a graph of Mz v. Mw for pilot plant, plant and other materials, as well as from batch reactor samples.

FIG. 4 displays Mz as a function of Mw for laboratory and pilot plant samples. As seen here, the linear-PS samples from batch reactor experiments superpose well with pilot plant samples. On the other hand, branched-PS samples made from batch reactor experiments follow the same trend as for pilot plant materials, but are shifted to higher Mw.

Correlation Between $\eta_0$ and Mw

The zero shear viscosity $\eta_0$ was calculated from dynamic rheological measurement at 170° C. as follows:

$$\eta_0 = \lim_{\omega \to 0} \frac{G''(\omega)}{\omega} \qquad \text{Formula (1)}$$

Figure 5:
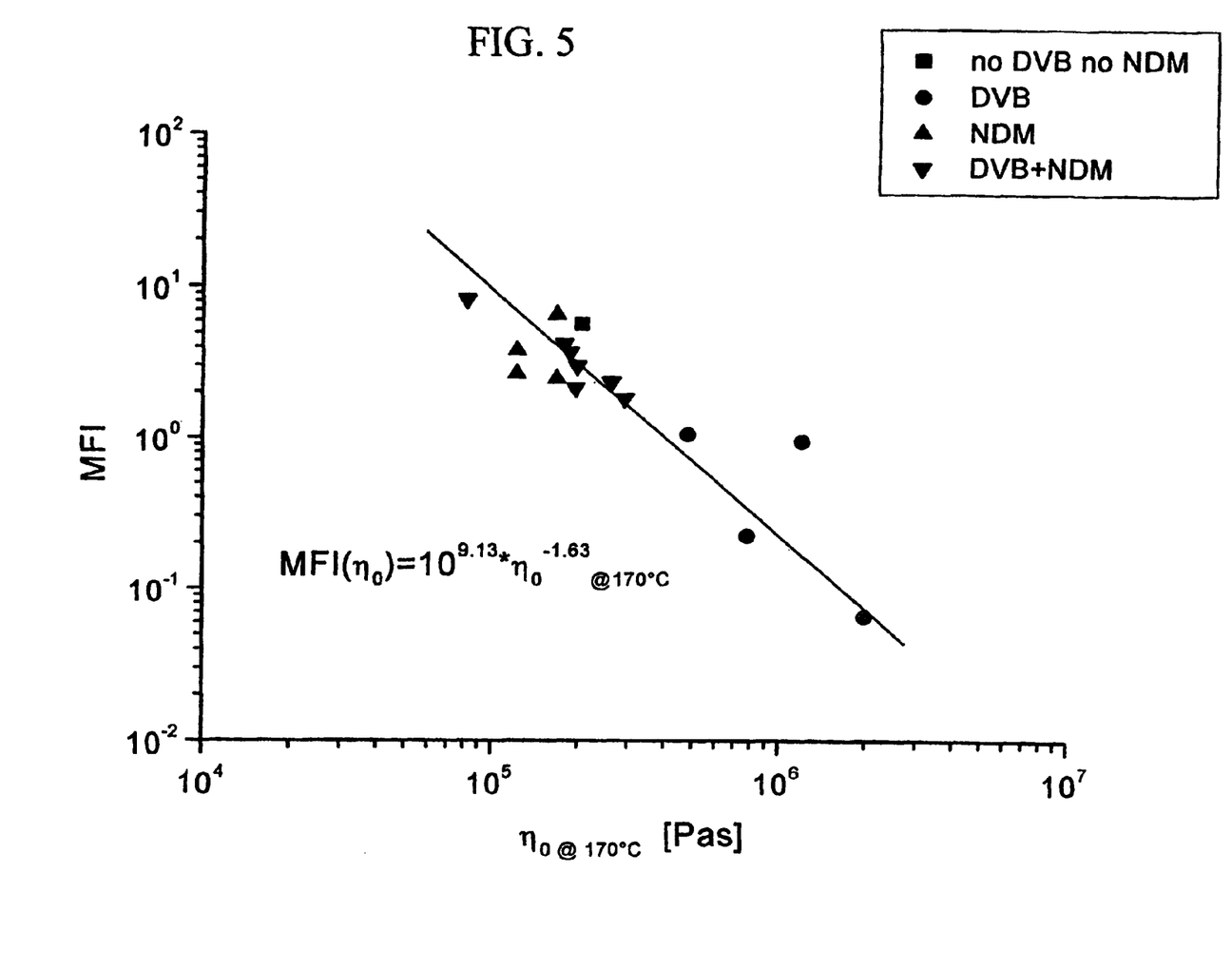
FIG. 5 is a logarithmic graph of melt flow index (MFI) as a function of zero shear viscosity ($\eta_0$) as measured at 170° C.
Figure 6:
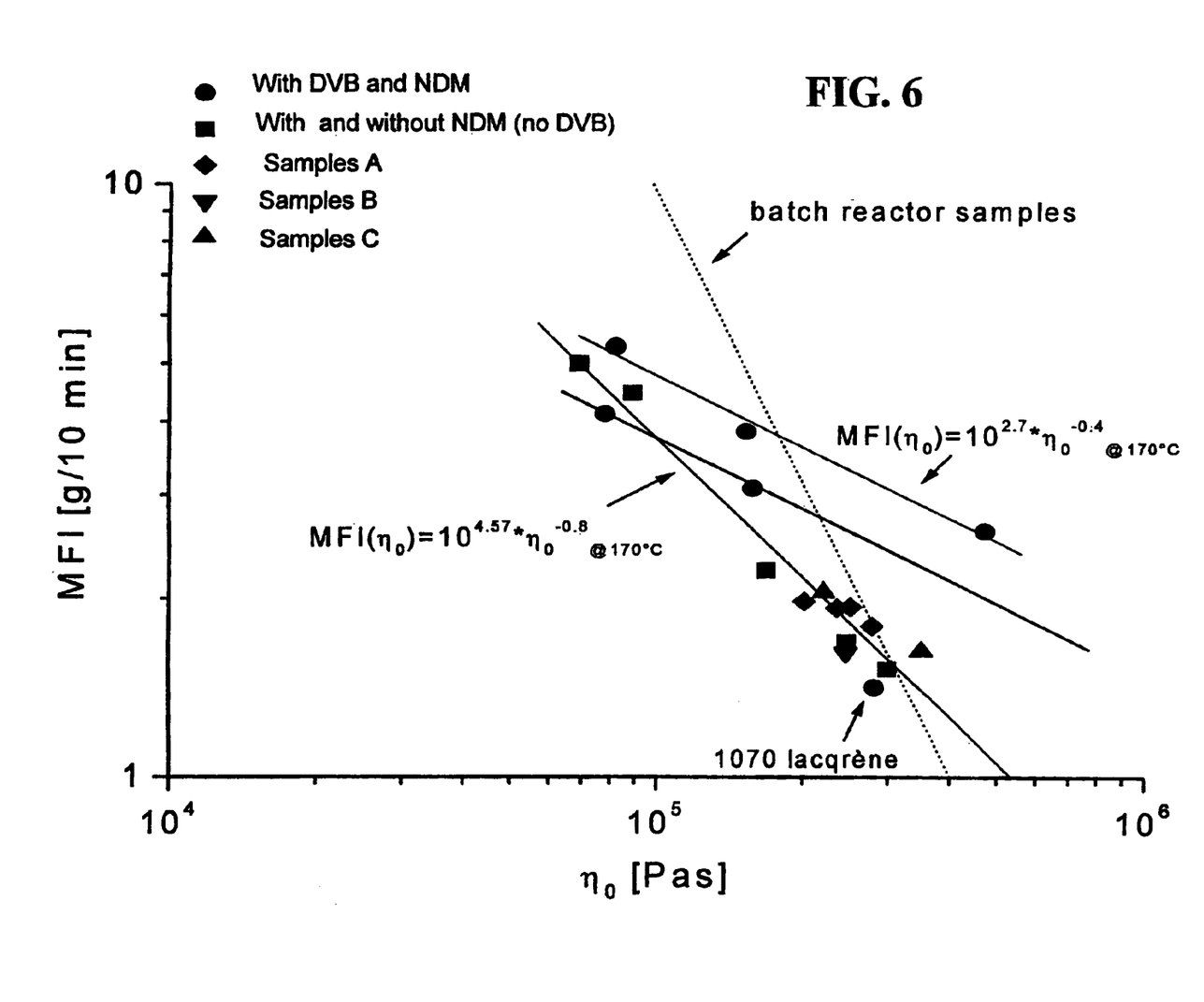
FIG. 6 is another logarithmic graph of MFI as a function of $\eta_0$ as measured at 170° C. for samples from various sources prepared in the presence of DVB and NDM.

For branched polystyrene the melt flow index (MFI) decreases as a power law of $\eta_0$ with an exponent equal to −1.63 (FIG. 5). By comparison with pilot plant materials the relationship determined for batch reactor samples does not apply to pilot plant samples (FIG. 6).

$$MFI = 10^{9.13} \cdot \eta_0^{-1.63} @170° C. \qquad \text{Formula (2)}$$

Correlation Between $\eta_0$ and Mw

Figure 7:
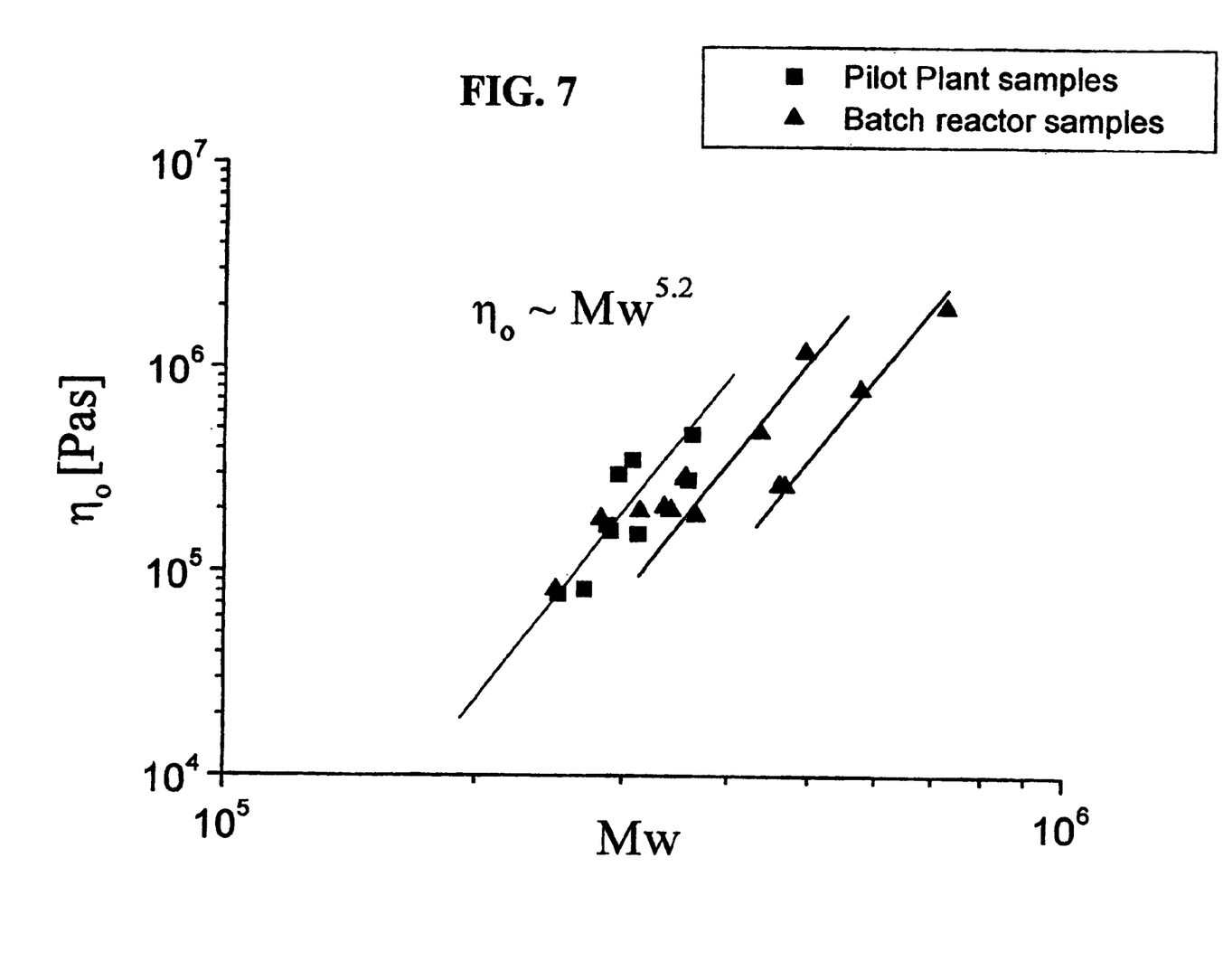
FIG. 7 is a logarithmic chart of a correlation between $\eta_0$ and Mw for samples from two sources.

Viscosity at zero shear rate $\eta_0$ increases as a power law of Mw with an exponent of 3.4 for linear chain and 5.2 for branched chains. The same relationship was found on batch reactor samples. For some reason that is probably related to the experimental error the data are shifted to higher Mw (FIG. 7).

Mathematical Model for Calculating $\eta_0$ as a Function of DVB and NDM

Figure 8:
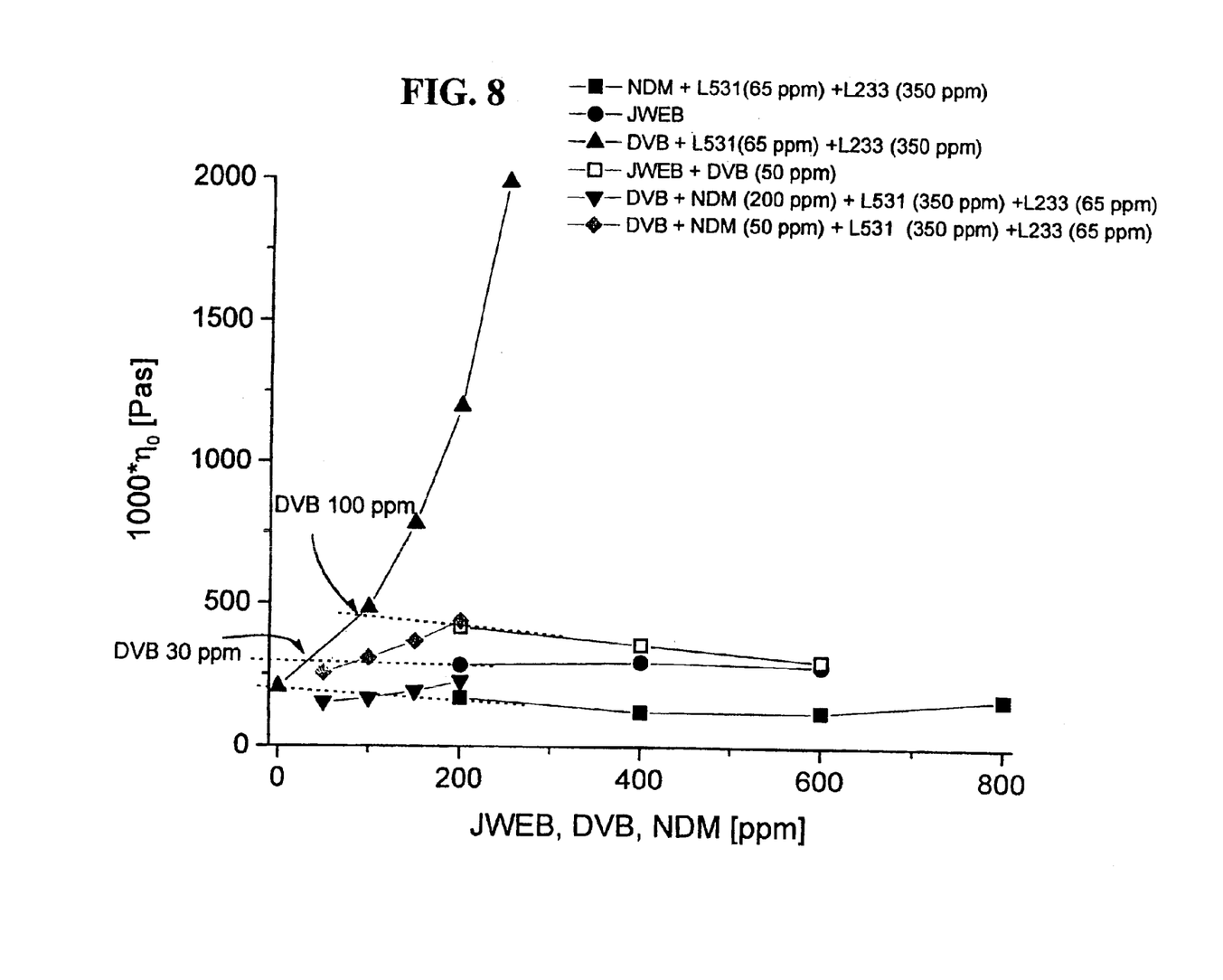
FIG. 8 is a graph of zero shear viscosity $\eta_0$ v. ppm of various components.

FIG. 8 shows the effect on $\eta_0$ by the individual components. Note that the effects are non-linear and the level of additives to produce different structures is not straightforward and extensive experimentation is needed to optimize the level of the additives to obtain branched polystyrene. It is clear that a method to optimize the level of two or three components would be of great importance and value in the synthesis of these materials.

A mathematical model was previously devised to estimate $\eta_0$ of two types of materials as a function of the amount of DVB and NDM. An equation was developed that required only four experimental data points $\{(0, 0); (x_{f0}, 0); (0, y_{f0}); (x_{f2}, y_{f2})\}$ necessary to have a complete picture of $\eta_0$ as a function of DVB and NDM.

The same work was conducted on the batch reactor samples in order to check the validity of the mathematical model that was proposed. As expected, $\eta_0$ increases as a power law of DVB, but does not decrease as a power law of NDM. Regarding the amount of DVB introduced, it appeared then that the viscosity drops between 0 to 200 ppm of NDM, and then stays constant. The transition to a steady state, in terms of NDM, depends to the amount of DVB introduced and increases with increasing the amount of DVB. The model was optimized based on these new observations.

A model that optimizes the rheological properties (viscosity, melt flow), molecular weight and polydispersity of polystyrene as a function of the relative composition in DVB, NDM, and JWEB was also developed. As noted, the model is supported by laboratory data. The basis of this phenomenological model is as follows:

$$\eta(x, y) = \frac{-\left[\eta(x, y_0) - e^{\left(\frac{-y_0}{t(x)}\right)} \cdot \eta(x, 0) + e^{\left(\frac{-y}{t(x)}\right)} \cdot \eta(x, 0) - e^{\left(\frac{-y}{t(x)}\right)} \cdot \eta(x, y_0)\right]}{\left[-1 + e^{\left(\frac{-y_0}{t(x)}\right)}\right]}$$ (Formula 3)

where x is the amount of DVB in ppm;
y is the amount of NDM in ppm;
$\eta_0$ is the zero shear viscosity;
$t(x)=55+315 \cdot \exp(-x/40)$
$\eta(x,0)=\eta(0,0)+\alpha^*\exp(x/\beta)$
$\eta(x,y_0)=\eta(0,y_0)+\gamma^*\exp(x/\delta)$ In Formula 3, only the four experimental data points (0,0) $(x_0,0)$ $(0,y_0)$ and $(x_0,y_0)$ are needed to have a complete picture of $\eta_0$ as a function of DVB (x) and NDM (y). The parameters $\alpha$, $\beta$, $\gamma$, and $\delta$ are determined empirically from $\eta(x,0)$ and $\eta(x,y_0)$. The function t(x) is determined from small scale reactor runs and can be used even if the model is applied to large scale reactors.

Figure 9:
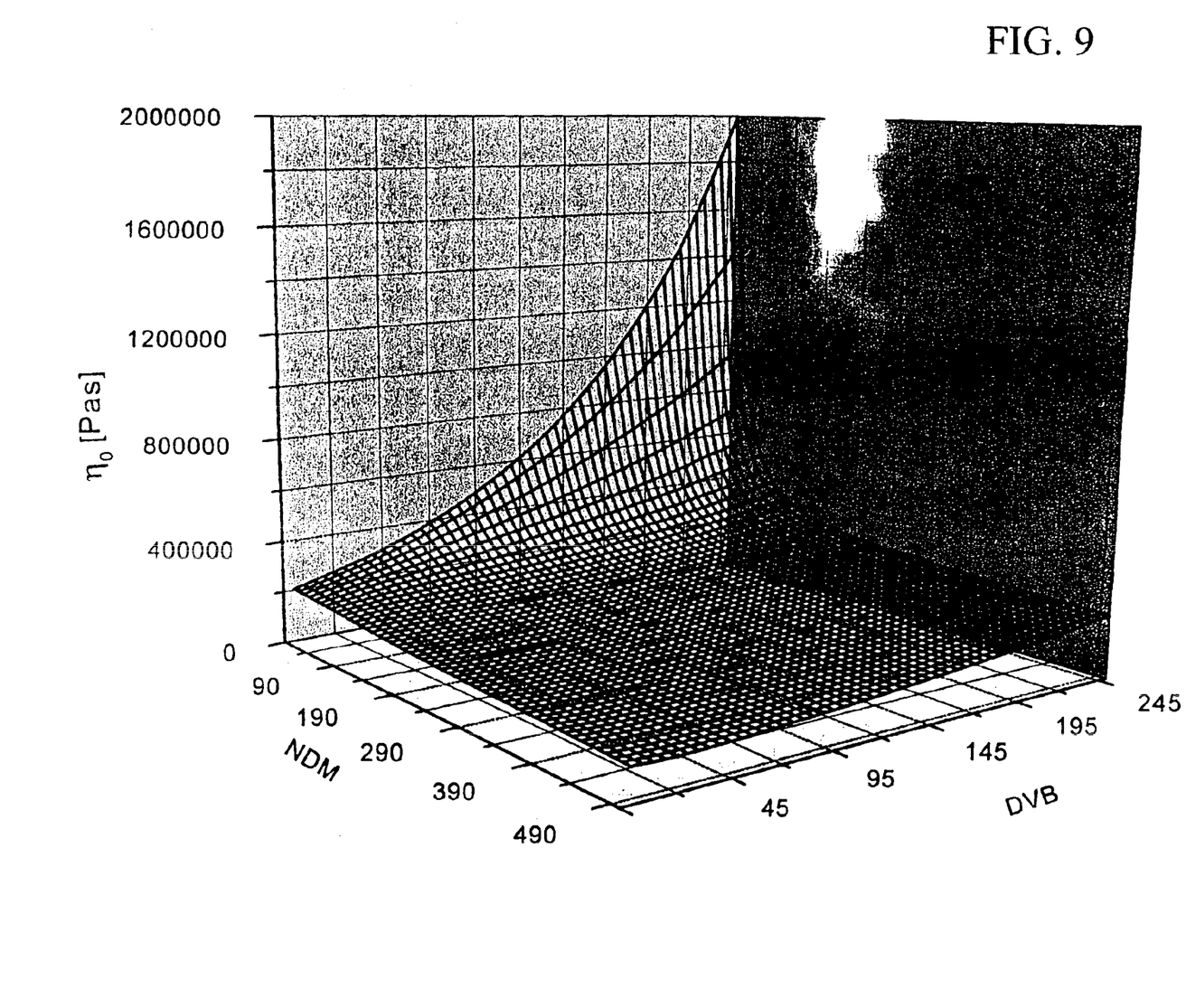
FIG. 9 is a three-dimensional graph of $\eta_0$ as a function of various levels of NDM and DVB using the mathematical model of the invention.

An example of the results expected with the model of this invention is shown in FIG. 9, where a 3-D graph shows the surface generated to relate the level of NDM and DVB with $\eta_0$. By using correlation between $\eta_0$ and melt flow index (MFI), the model can be used to predict the levels of DVB and NDM to produce a resin with a specific melt flow.

Figure 10A:
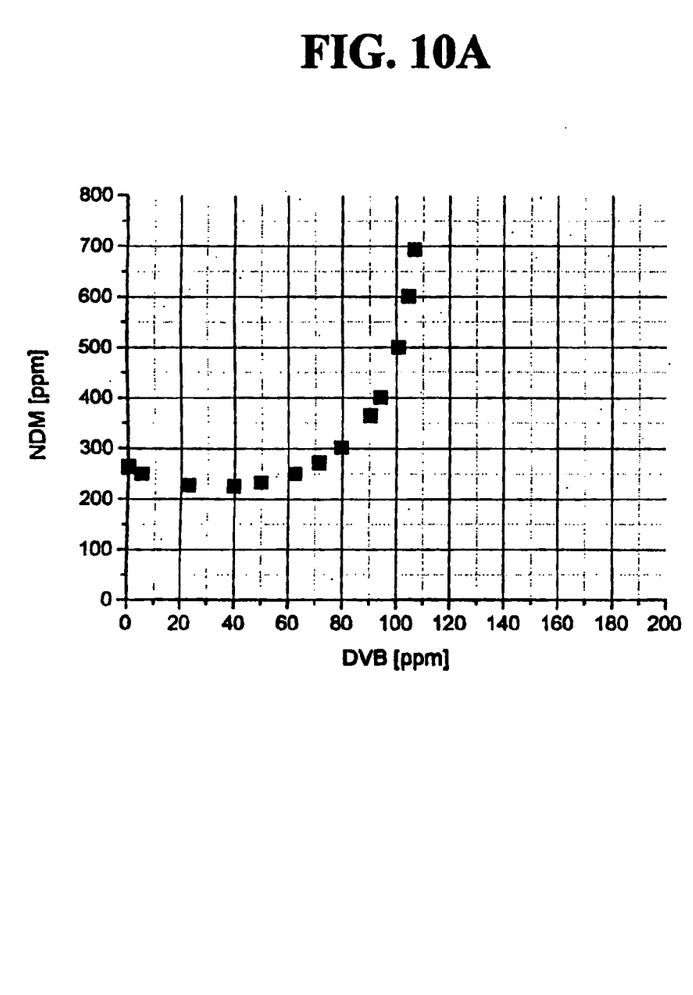
FIG. 10A is a graph of the relative composition in DVB and NDM to obtain a 5 MFI from batch reactor samples using the mathematical model of the invention.
Figure 10B:
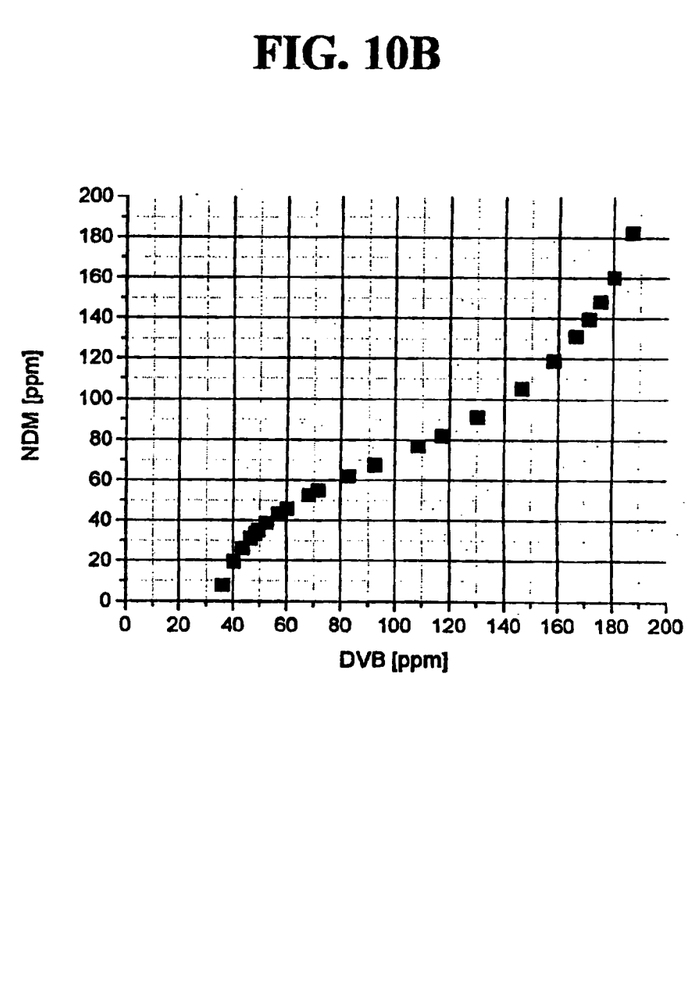
FIG. 10B is a graph of the relative composition in DVB and NDM to obtain a 5 MFI from pilot plant samples using the mathematical model of the invention.

FIGS. 10A and 10B show examples of the profiles that can be obtained using the model. FIG. 10A is an example curve of the relative composition in DVB and NDM to obtain a MFI of 5 from batch reactor samples. FIG. 10B is an example curve of the relative composition in DVB and NDM to obtain a MFI of 5 from pilot plant samples.

The utility of the model has been demonstrated by predicting the levels of NDM and DVB required to produce a 5 MFI material in a continuous pilot plant. As shown in Table III, the relative composition in DVB and NDM as predicted by the model and used by a pilot plant is in the range of +/− 2% error. Those skilled in the art can appreciate that the phenomenological method can be applied with additional additives, such as tri- and tetrafunctional initiators and other multifunctional additives.

TABLE III

Relative Composition of DVB and NDM to Make a Branched 5 MFI Polystyrene Crystal

| Pilot Plant | Model | Error +/− |
|---|---|---|
| DVB [ppm] 60 | 62 | 1.7% |
| NDM [ppm] 50 | 48 | 2.0% |

The resins of this invention are expected to find use in foam applications where increased density and high storage moduli provide a more stable product. Specific foam applications include, but are not necessarily limited to, insulation foam boards, cups, plates, food packaging. The styrene-based polymers of the present invention are expected to find use in other injection molded or extrusion molded articles. Thus, the styrene-based polymers of the present invention may be widely and effectively used as materials for injection molding, extrusion molding or sheet molding. It is also expected that the polymer resins of this invention can be used as molding material in the fields of various different products, including, but not necessarily limited to, household goods, electrical appliances and the like.

In the foregoing specification, the invention has been described with reference to specific embodiments thereof, and has been demonstrated as effective in providing methods for preparing polymers using accelerators together with peroxide initiators. However, it will be evident that various modifications and changes can be made thereto without departing from the scope of the invention as set forth in the appended claims. Accordingly, the specification is to be regarded in an illustrative rather than a restrictive sense. For example, specific combinations or amounts of vinylaromatic monomers, diene copolymers, multifunctional peroxide initiators, chain transfer agents, cross-linking agents, and other components falling within the claimed parameters, but not specifically identified or tried in a particular polymer system, are anticipated and expected to be within the scope of this invention. Further, the methods of the invention are expected to work at other conditions, particularly temperature, pressure and proportion conditions, than those exemplified herein.

We claim:

1. A method for producing an improved polymerized product comprising:
   polymerizing at least one vinylaromatic monomer in the presence of
      at least one multifunctional initiator selected from the group consisting of trifunctional and tetrafunctional peroxides,
      at least one chain transfer agent; and
      at least one cross-linking agent; and
   recovering a polymerized product where in polymerizing the monomer, the multifunctional initiator is selected from the group consisting of tri or tetrakis t-alkylperoxycarbonates, tri or tetrakis (polyether peroxycarbonate), tri or tetrakis-(t-butylperoxycarbonyloxy) methane, tri or tetrakis-(t-butylperoxycarbonyloxy) butane, tri or tetrakis (t-amylperoxycarbonyloxy) butane and tri or tetrakis (t-$C_{4-6}$ alkyl monoperoxycarbonates), and mixtures thereof.

2. The method of claim 1 where in polymerizing the monomer, the vinylaromatic monomer is styrene.

3. The method of claim 1 where the multifunctional initiator is present in an amount ranging from about 100 to about 1200 ppm, based on the vinylaromatic monomer.

4. The method of claim 1 where the chain transfer agent is a mercaptan.

5. The method of claim 4 where the chain transfer agent is selected from the group consisting of n-octyl mercaptan, t-octyl mercaptan, n-dodecyl mercaptan (NDM), t-dodecyl mercaptan, tridecyl mercaptan, tetradecyl mercaptan, n-hexadecyl mercaptan, n-decyl mercaptan, t-nonyl mercaptan, ethyl mercaptan, isopropyl mercaptan, t butyl mercaptan, cyclohexyl mercaptan, benzyl mercaptan and mixtures thereof.

6. The method of claim 1 where the chain transfer agent is added in the amount up to about 800 ppm, based on the vinylaromatic monomer.

7. The method of claim 1 where in polymerizing the monomer, the polymerizing is conducted at a temperature between about 110° C. and about 170° C.

8. The method of claim 1 where in polymerizing the monomer, the polymerizing is conducted in the presence of at least one diene polymer.

9. The method of claim 8 where the weight ratio of vinylaromatic monomer to diene polymer ranges from about 97:3 to about 85:15.

10. The method of claim 1 where in recovering the product, the polymerized product is high impact polystyrene (HIPS).

11. The method of claim 1 where the cross-linking agent is selected from the group consisting of polyfunctional monomers with two or more vinyl groups.

12. The method of claim 1 where the cross-linking agent is selected from the group consisting of divinyl benzene (DVB), 1,9-decadiene, 1,7-octadiene, 2,4,6-triallyloxy-1,3,5-triazine, pentaerythritol triacrylate (PETA), ethylene glycol diacrylate, ethylene glycol dimethacrylate, triethylene glycol diacrylate, tetraethylene glycol dimethacrylate, and mixtures thereof, and the concentration of the cross-linking agent ranges from about 25 ppm to about 400 ppm.

13. The method of claim 1 where the chain transfer agent is NDM, the cross-linking agent is DVB, the multifunctional initiator is tetra t-butylperoxycarbonate and the levels of these components are optimized for given molecular weights, melt flow indices and zero shear viscosities according to the equation:

$$\eta(x, y) = \frac{-\left[\eta(x, y_0) - e^{\left(\frac{-y_0}{t(x)}\right)} \cdot \eta(x, 0) + \frac{e^{\left(\frac{-y}{t(x)}\right)} \cdot \eta(x, 0) - e^{\left(\frac{-y}{t(x)}\right)} \cdot \eta(x, y_0)\right]}{\left[-1 + e^{\left(\frac{-y_0}{t(x)}\right)}\right]}} \quad \text{(Formula 3)}$$

where x is the amount of DVB in ppm;
y is the amount of NDM in ppm;
$\eta_0$ is the zero shear viscosity;
$t(x) = 55 + 315 \cdot \exp(-x/40)$;
$\eta(x,0) = \eta(0,0) + \alpha^* \exp(x/\beta)$;
$\eta(x,y_0) = \eta(0,y_0) + \gamma^* \exp(x/\delta)$;
where the parameters $\alpha$, $\beta$, $\gamma$, and $\delta$ are determined empirically from $\eta(x,0)$ and $\eta(x,y_0)$ and four experimental data points $(0,0)$ $(x_0,0)$ $(0,y_0)$ and $(x_0,y_0)$.

14. A vinylaromatic monomer resin comprising at least one vinylaromatic monomer, at least one multifunctional initiator selected from the group consisting of trifunctional and tetrafunctional peroxides, at least one chain transfer agent, and at least one cross-linking agent where the multifunctional initiator is selected from the group consisting of tri or tetrakis t-alkylperoxycarbonates, tri or tetrakis (polyether peroxycarbonate), tri or tetrakis-(t-butylperoxycarbonyloxy) methane, tri or tetrakis-(t-butylperoxycarbonyloxy) butane, tri or tetrakis (t-amylperoxycarbonyloxy) butane and tri or tetrakis (t-$C_{4-6}$ alkyl monoperoxycarbonates, and mixtures thereof.

15. The vinylaromatic monomer resin of claim 14 where the vinylaromatic monomer is styrene.

16. The vinylaromatic monomer resin of claim 14 where the multifunctional initiator is present in an amount ranging from about 100 to about 1200 ppm, based on the vinylaromatic monomer.

17. The vinylaromatic monomer resin of claim 14 where the chain transfer agent is a mercaptan.

18. The vinylaromatic monomer resin of claim 17 where the chain transfer agent is selected from the group consisting of n-octyl mercaptan, t-octyl mercaptan, n-dodecyl mercaptan (NDM), t-dodecyl mercaptan, tridecyl mercaptan, tetradecyl mercaptan, n-hexadecyl mercaptan, n-decyl mercaptan, t-nonyl mercaptan, ethyl mercaptan, isopropyl mercaptan, t butyl mercaptan, cyclohexyl mercaptan, benzyl mercaptan and mixtures thereof.

19. The vinylaromatic monomer resin of claim 14 where the chain transfer agent is present in an amount up to about 800 ppm, based on the vinylaromatic monomer.

20. The vinylaromatic monomer resin of claim 14 further comprising at least one diene polymer.

21. The vinylaromatic monomer resin of claim 20 where the weight ratio of vinylaromatic monomer to diene polymer ranges from about 97:3 to about 85:15.

22. The vinylaromatic monomer resin of claim 21 where the resulting polymerized product is high impact polystyrene (HIPS).

23. The vinylaromatic monomer resin of claim 14 where the crosslinking agent is selected from the group consisting of polyfunctional monomers with two or more vinyl groups.

24. The vinylaromatic monomer resin of claim 14 where the cross-linking agent is divinyl benzene (DVB), 1,9-decadiene, 1,7-octadiene, 2,4,6-triallyloxy-1,3,5-triazine, pentaerythritol triacrylate (PETA), ethylene glycol diacrylate, ethylene glycol dimethacrylate, triethylene glycol diacrylate, tetraethylene glycol dimethacrylate and mixtures thereof, and the concentration of the cross-linking agent ranges from about 25 ppm to about 400 ppm.

25. The vinylaromatic monomer resin of claim 14 where the chain transfer agent is NDM, the cross-linking agent is DVB, the multifunctional initiator is tetra t-butylperoxycarbonate and the levels of these components are optimized for given molecular weights, melt flow indices and zero shear viscosities according to the equation:

$$\eta(x, y) = \frac{-\left[\eta(x, y_0) - e^{\left(\frac{-y_0}{t(x)}\right)} \cdot \eta(x, 0) + \frac{e^{\left(\frac{-y}{t(x)}\right)} \cdot \eta(x, 0) - e^{\left(\frac{-y}{t(x)}\right)} \cdot \eta(x, y_0)\right]}{\left[-1 + e^{\left(\frac{-y_0}{t(x)}\right)}\right]}} \quad \text{(Formula 3)}$$

where x is the amount of DVB in ppm;
y is the amount of NMD in ppm;
$\eta_0$ is the zero shear viscosity;
$t(x) = 55 + 315 \cdot \exp(-x/40)$;
$\eta(x,0) = \eta(0,0) + \alpha^* \exp(x/\beta)$;
$\eta(x,y_0) = \eta(0,y_0) + \gamma^* \exp(x,\delta)$;
where the parameters $\alpha$, $\beta$, $\gamma$, and $\delta$ are determined empirically from $\eta(x,0)$ and $\eta(x,y_0)$ and four experimental data points $(0,0)$ $(x_0,0)$ $(0,y_0)$ and $(x_0,y_0)$.

26. A vinylaromatic/diene graft copolymer made by the method comprising:
polymerizing at least one vinylaromatic monomer with at least one polydiene, in the presence of
at least one multifunctional initiator;
at least one chain transfer agent; and
at least one cross-linking agent; and
recovering a polymerized product where in polymerizing the vinylaromatic monomer with the polydiene, the multifunctional initiator is selected from the group consisting of tri or tetrakis t-alkylperoxycarbonates, tri or tetrakis (polyether peroxycarbonate), tri or tetrakis-(t-butylperoxycarbonyloxy) methane, tri or tetrakis-(t-butylperoxycarbonyloxy) butane, tri or tetrakis (t-amylperoxycarbonyloxy) butane and tri or tetrakis (t-$C_{4-6}$ alkyl monoperoxycarbonates, and mixtures thereof.

27. The copolymer of claim 26 where in polymerizing the vinylaromatic monomer with the polydiene, the vinylaromatic monomer is styrene and the polydiene is polybutadiene.

28. The copolymer of claim 26 where the multifunctional initiator is present in an amount ranging from about 100 to about 1200 ppm, based on the vinylaromatic monomer.

29. The copolymer of claim 26 where the chain transfer agent is a mercaptan.

30. The copolymer of claim 29 where the chain transfer agent is selected from the group consisting of n-octyl mercaptan, t-octyl mercaptan, n-dodecyl mercaptan (NDM), t-dodecyl mercaptan, tridecyl mercaptan, tetradecyl mercaptan, hexadecyl mercaptan, and mixtures thereof.

31. The copolymer of claim 26 where the chain transfer agent is present in an amount up to about 800 ppm, based on the vinylaromatic monomer.

32. The copolymer of claim 26 where in polymerizing the vinylaromatic monomer with the polydiene, the polymerizing is conducted at a temperature between about 110° C. and about 170° C.

33. The copolymer of claim 26 where the weight ratio of vinylaromatic monomer to polydiene ranges from about 97:3 to about 85:15.

34. The copolymer of claim 26 where in recovering the product, the copolymerized product is high impact polystyrene (HIPS).

35. The copolymer of claim 26 where the cross-linking agent is selected from the group consisting of polyfunctional monomers with two or more vinyl groups.

36. The copolymer of claim 26 where the cross-linking agent is divinyl benzene (DVB), 1,9-decadiene, 1,7-octadiene, 2,4,6-triallyloxy-1,3,5-triazine pentaerythritol triacrylate (PETA), ethylene glycol diacrylate, ethylene glycol dimethacrylate, triethylene glycol diacrylate, tetraethylene glycol dimethacrylate and mixtures thereof and the concentration of the cross-linking agent ranges from about 25 ppm to about 400 ppm.

37. The copolymer of claim 26 where the chain transfer agent is NDM, the cross-linking agent is DVB, the multifunctional initiator is tetra t-butylperoxycarbonate and the levels of these components are optimized for given molecular weights, melt flow indices and zero shear viscosities according to the equation:

$$\eta(x, y) = \frac{-\left[\eta(x, y_0) - e^{\left(\frac{-y_0}{t(x)}\right)} \cdot \eta(x, 0) + e^{\left(\frac{-y}{t(x)}\right)} \cdot \eta(x, 0) - e^{\left(\frac{-y}{t(x)}\right)} \cdot \eta(x, y_0)\right]}{\left[-1 + e^{\left(\frac{-y_0}{t(x)}\right)}\right]} \quad \text{(Formula 3)}$$

where x is the amount of DVB in ppm;

y is the amount of NMD in ppm;

$\eta_0$ is the zero shear viscosity;

$t(x)=55+315\cdot\exp(-x/40)$;

$\eta(x,0)=\eta(0,0)+\alpha^*\exp(x/\beta)$;

$\eta(x,y_0)=\eta(0,y_0)+\gamma^*\exp(x,\delta)$;

where the parameters $\alpha$, $\beta$, $\gamma$, and $\delta$ are determined empirically from $\eta(x,0)$ and $\eta(x,y_0)$ and four experimental data points $(0,0)$ $(x_0,0)$ $(0,y_0)$ and $(x_0,y_0)$.

38. A foamed article made with the vinylaromatic monomer resin of claim 14.

39. A foamed article made with the vinylaromatic/diene graft copolymer of claim 26.

* * * * *